United States Patent
Kranz

(10) Patent No.: US 7,420,352 B2
(45) Date of Patent: Sep. 2, 2008

(54) POWER SUPPLY SYSTEM FOR A VEHICLE

(75) Inventor: Herbert Kranz, Utting (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/256,111

(22) Filed: Oct. 24, 2005

(65) Prior Publication Data
US 2006/0061333 A1 Mar. 23, 2006

Related U.S. Application Data

(63) Continuation of application No. PCT/EP2004/002811, filed on Mar. 18, 2004.

(30) Foreign Application Priority Data

Apr. 24, 2003 (DE) ................ 103 18 494

(51) Int. Cl.
*H02J 7/00* (2006.01)
*H02J 00/16* (2006.01)
*B60K 8/00* (2006.01)

(52) U.S. Cl. ........... 320/104; 320/112; 320/150; 320/166; 180/54.1

(58) Field of Classification Search .......... 320/112, 320/124, 137, 128, 104, 166, 150; 307/10.7; 180/54.1

See application file for complete search history.

(56) References Cited

U.S. PATENT DOCUMENTS 5,194,799 A 3/1993 Tomantschger
5,534,364 A * 7/1996 Watanabe et al. ............. 429/61
5,928,020 A * 7/1999 Bishop et al. ................ 320/112
6,016,047 A 1/2000 Notten et al.
6,321,707 B1 * 11/2001 Dunn ........................ 320/104

(Continued)

FOREIGN PATENT DOCUMENTS

DE 693 09 975 T2 7/1997

(Continued)

OTHER PUBLICATIONS

German Search Report Ref. No. AJ-33/Kg/Cr EM 14042, dated Apr. 24, 2003.

*Primary Examiner*—Gary L Laxton
*Assistant Examiner*—Yalkew Fantu
(74) *Attorney, Agent, or Firm*—Crowell & Moring LLP

(57) ABSTRACT

Power supply system for a vehicle, in the case of which an onboard voltage supply system for supplying electric consuming devices can be fed by at least one power accumulator, and in which external electric consuming devices can be connected to the onboard voltage supply system. At least one portable removable accumulator, which can be charged by way of the onboard voltage supply system of the vehicle, is provided, which removable accumulator is constructed as an energy accumulator expansion unit controllable by way of a battery management system, by way of which energy accumulator expansion unit electric consuming devices, which are part of the vehicle and/or external electric consuming devices, may be operated, so that the removable accumulator can optionally be utilized as a stationary power supply device in the vehicle when the onboard voltage supply system is connected or, when the onboard voltage supply system is not connected, can be used as a mobile power supply device independently of the vehicle.

17 Claims, 1 Drawing Sheet

U.S. PATENT DOCUMENTS 6,384,489 B1 * 5/2002 Bluemel et al. ............ 307/10.1
6,710,578 B1 * 3/2004 Sklovsky ..................... 320/127

FOREIGN PATENT DOCUMENTS

| DE | 198 16 052 A1 | 10/1998 |
| DE | 199 07 003 A1 | 8/2000 |
| DE | 199 25 570 C2 | 5/2001 |

* cited by examiner

POWER SUPPLY SYSTEM FOR A VEHICLE

CROSS-REFERENCE TO RELATED APPLICATIONS

This application is a continuation of PCT Application No. PCT/EP2004/002811 filed on Mar. 18, 2004, which claims priority to German Application 103 18 494.5 filed Apr. 24, 2003.

BACKGROUND AND SUMMARY OF THE INVENTION

The invention relates to a power supply system for a vehicle, in the case of which an onboard voltage supply system for supplying electric consuming devices (loads) can be fed by at least one power (energy) accumulator, and in which external electric consuming devices can be connected to the onboard voltage supply system.

The fixedly installed power accumulators in vehicles are designed for supplying the onboard voltage supply system of the vehicle. Additionally, connections are usually provided to which external consuming devices can be connected. These consuming devices are either driven directly by way of the vehicle battery or, in the case of cellular phones, have a separate power accumulator which can be charged by way of the vehicle battery. However, devices, such as a handsfree device, may also be provided, in the case of which, beyond a pure charging function, relevant data can also be exchanged between a consuming device and the vehicle, or the onboard voltage supply system.

A holder for portable cell phones is known from German Patent document DE 198 16 052 A1. The holder has a power supply connection which, when the cell phone is pushed into a shaft, connects the cell phone with an external power supply source (vehicle battery). Furthermore, the holder has a charging connection which, when the cell phone is slid into the shaft, connects a power accumulator of the cell phone with an external charging apparatus or a charging apparatus integrated in the holder.

It is a disadvantage that the holder can be operated only with a cell telephone. In addition, the holder is fixedly integrated in a console and the mobile power accumulator of the cell phone can be utilized only for the cell phone itself. Furthermore, accumulators in handsets of cordless phones generally do not have sufficient capacity to be used for other purposes. The holder or the power accumulator of the cell phone is therefore not suitable for more extensive applications, for example, for the operation of a notebook computer.

From German Patent document DE 199 25 570 C2, a communication system for a vehicle is known. The communication system has a communication platform unit for the variable linking of one or more application units to several radio communication channels. As a result, a mobile communication unit can be operated, for example, on the mobile communication channel which just then is most advantageous depending on the spatial area. A stand-by battery, by which the operation of the communication platform unit can be continued when the main battery supply fails, can be assigned to the communication platform unit.

It is disadvantageous that the stand-by battery is designed only as an emergency supply for the communication platform unit. However, an operation for other consuming devices is not provided. The communication platform unit with the stand-by battery can therefore not be used for other purposes.

Furthermore, from German Patent document DE 199 07 003 A1, a system box which has receiving compartments for office equipment is known for a use in vehicles. The system box can be operated by way of the vehicle battery and, in addition, has a 220 V power connection.

It is disadvantageous that the vehicle battery or the power-producing generator is heavily loaded by the operation of the system box. In particular, when, for example, a PC is used for an extended period of time while the vehicle is stopped, that is, the vehicle is not in operation, the vehicle battery will rapidly reach the limit of its capacity. The power connection can be used only when a reachable power plug is in the vicinity. The mobile usability of the system box is therefore relatively limited and inflexible.

An aspect of the present invention is therefore to develop a power supply system for a vehicle, which can be used in a flexible and lastingly useful manner by different connectable consuming devices, also when the vehicle is not in operation.

According to the invention, this is achieved by providing a power supply system for a vehicle, in the case of which an onboard voltage supply system for supplying electric consuming devices can be fed by at least one power accumulator, and in which external electric consuming devices can be connected to the onboard voltage supply system. At least one portable removable accumulator, which can be charged by way of the onboard voltage supply system of the vehicle, is provided. The removable accumulator is constructed as a power accumulator expansion unit controllable by way of a battery management system, by way of which power accumulator expansion unit electric consuming devices, which are part of the vehicle and/or external electric consuming devices, can be operated, so that the removable accumulator can optionally be utilized as a stationary power supply device in the vehicle when the onboard voltage supply system is connected or, when the onboard voltage supply system is not connected, can be used as a mobile power supply device independently of the vehicle.

As a result of the fact that the removable accumulator is provided, the user has a power accumulator expansion unit at his disposal, which can be used in multiple manners and which the user can optionally utilize in the vehicle or as a mobile portable power supply device. The battery management system is essentially used for controlling and monitoring the charging process and the operation of the removable accumulator.

By way of the battery management system, the charging operation or the power output from the onboard voltage supply system to the removable accumulator is regulated. However, the vehicle electronic system or the onboard voltage supply system may also demand the power of the removable accumulator by way of the battery management system. The removable accumulator can, therefore, support the vehicle battery and expand the efficiency of the power supply system of the vehicle. As a result, it becomes possible to also operate external equipment in the vehicle for an extended period of time when the vehicle is not in operation. It is also contemplated that the power accumulator expansion unit supports the onboard voltage supply system for certain functions of superior consuming devices belonging to the on-board system, for example, during a start-up operation, or is used for the operation of electric devices of the vehicle which are to be operated also in an inoperative condition of the vehicle before the start-up operation. The removable accumulator can also be used as a relief for the vehicle battery. The portable removable accumulator can also be taken along away from the vehicle and supply certain equipment with power at any location. It can, therefore, be used in a mobile and flexible manner.

According to a preferred embodiment of the invention, the external consuming devices belong to the group of office equipment, communication devices, and electronic entertainment systems.

The removable accumulator is suitable particularly for the power supply of office devices or the like. The power supply system according to the invention, therefore, meets the rising demand for the mobile utilization of such devices. The user can, for example, use the power accumulator expansion unit for office functions in the vehicle as well as at home or at external meetings. It therefore becomes possible to, for example, extensively use a notebook on the road without having to depend on a power connection in-between. A discharged removable accumulator can be recharged by way of the vehicle and will then again be available in an unrestricted manner. Furthermore, it becomes possible to operate power-intensive entertainment equipment, such as a television set, for an extended period of time when the vehicle is switched off. It is also contemplated to operate mobile household appliances, which were taken along, by way of the removable accumulator.

According to another preferred embodiment of the invention, a slide-in unit is arranged in the vehicle interior, into which slide-in unit at least one removable accumulator can be fitted as a slide-in device.

A slide-in unit, such as a standard slide-in unit in a vehicle console, is particularly suitable for accommodating an removable accumulator in a particularly practical and space-saving manner. The connections of the removable accumulator required for the linkage to the onboard wiring system may preferably be integrated in the slide-in unit as plug-in connections.

According to another preferred embodiment of the invention, the battery management system is integrated in the removable accumulator.

The integration of the battery management system in the removable accumulator is cost-saving because the expenditures of expansions on the vehicle electronic system itself are minimized. As a result, particularly in the case of a possible exchange of an removable accumulator for another removable accumulator with different specifications, no extensive servicing operations have to be carried out on the vehicle electronic system, and/or no high-expenditure change-overs have to be made. Furthermore, the integrated battery management system can be used for regulating the power supply of a piece of equipment connected to the removable accumulator in the mobile operation independently of the vehicle. The integrated battery management system, therefore, carries out a double function, in the vehicle and independently of the vehicle, combined with a system.

According to another preferred embodiment of the invention, accumulator-relevant parameters can be exchanged by way of the battery management system bidirectionally between the removable accumulator and the onboard voltage supply system.

Because of the fact that, by way of the battery management system, parameters can be bidirectionally exchanged with the onboard voltage supply system, on the one hand, the vehicle can receive important accumulator data information and, on the other hand, the power accumulator expansion can be optimally coordinated with the vehicle wiring. A CAN databus system is preferably provided for the control and for the data exchange. An accumulator coding can also be provided. In particular, the charging condition of the removable accumulator can be reported to the onboard voltage supply system. It is also contemplated that, by use of the battery management system, the supplying of electric power to the removable accumulator by the onboard voltage supply system can be prioritized with respect to other functions. Furthermore, the battery management system may have a limiting function so that a defined maximal voltage and current intensity cannot be exceeded when the removable accumulator is supplied with power. The limiting function may also have an overload protection, which avoids an overloading of the removable accumulator when supplying power to consuming devices. A safety fuse can additionally be installed in the removable accumulator, which is triggered in the event of an overloading. The limiting function prevents a triggering of this safety fuse in the normal operation. It is also contemplated that the battery management system has a blocking function so that the power stored in the removable accumulator can be called-in only for certain defined functions. Furthermore, the accumulator expansion unit may also be equipped with time functions. Possible so-called "package" losses by the additional accumulator or accumulators can be compensated again after the demand no longer exists.

According to another preferred embodiment of the invention, the removable accumulator can be charged by way of an external power supply unit. As a result, in addition to being able to be charged by way of the onboard wiring, the removable accumulator can also be charged by via a corresponding charging device at the customary 220 V line voltage. The removable accumulator can, therefore, be operated in an even more versatile manner. The user can recharge the accumulator expansion unit virtually wherever a power supply system is accessible.

According to another preferred embodiment of the invention, the removable accumulator is constructed as a lithium ion polymer battery.

Lithium ion polymer batteries are particularly suitable for use as removable accumulators. They are very efficient, have a low weight and a compact construction. Such batteries are already commercially available. They are offered, for example, under the name PowerPad™ with typical specifications of: Dimension: DIN A4×9.5 mm, weight 1.15 kg, power: 11 ampere hours (160 Wh, 15 V), from the firm Electrovaya, Toronto, Canada, as a power accumulator expansion unit for laptops (up to 16 hours of operating time). Such polymer batteries can be reworked as removable accumulators for the power supply system according to the invention for a vehicle. Conventional, heavy and impractical lead acid batteries, which may have been carried along as booster batteries for operating external equipment, thus become superfluous.

According to another preferred embodiment, several removable accumulators are provided, which are in each case adapted to different applications. Because of the fact that several removable accumulators are provided, that accumulator expansion unit which has the most favorable specifications for a respective use can be selected. It is also contemplated to operate several units simultaneously.

Additional details of the invention are found in the following detailed description and the attached drawing, which illustrates a preferred embodiment of the invention as an example.

DETAILED DESCRIPTION OF THE DRAWING

Figure 1:
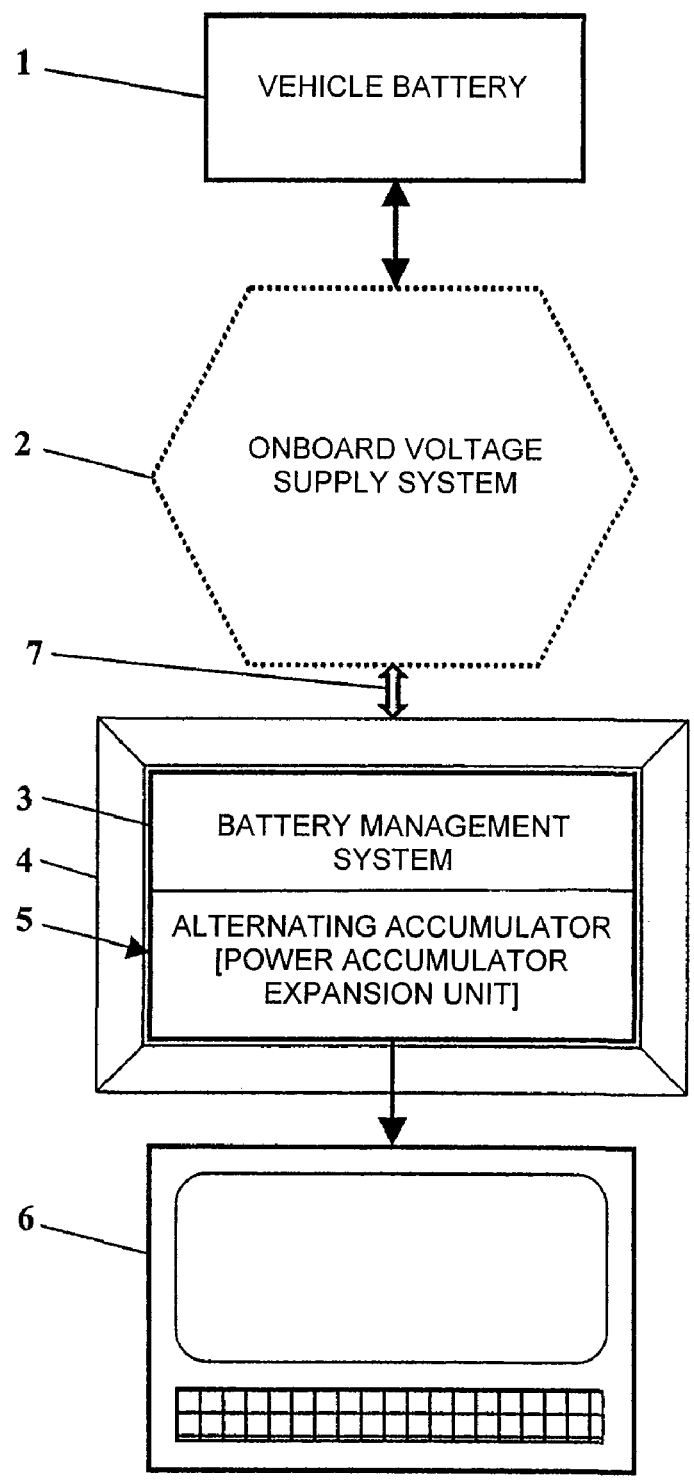
FIG. 1 is a block diagram of a power supply system of a vehicle having an removable accumulator.

A power supply system for a vehicle consists essentially of an onboard voltage supply system 2 and of an removable accumulator 5.

The onboard voltage supply system 2 of the vehicle is supplied by a vehicle battery 1, for example, constructed as a conventional electrochemical rechargeable 12 V power accumulator on a lead acid basis. A slide-in unit 4 is arranged in the vehicle interior, for example, in a console. The removable accumulator(s) 5, advantageously a high performance power accumulator of a lithium ion polymer battery construction, may be slid into this slide-in unit 4. The slide-in unit 4 has connections (not shown) for charging the removable accumulator 5 by way of the onboard voltage supply system 2. Additional connections to superior vehicle wiring functions are provided and made available for the removable accumulator 5 or the power accumulator expansion unit. The connections are advantageously constructed as plug-type connections which, when the removable accumulator 5 is slid into the slide-in unit 4, are connected with plug-type connections correspondingly provided on the accumulator side. In addition, preferably several power accumulator expansion units may be connected. The data exchange and the control between the onboard voltage supply system 2 and the removable accumulator 5 advantageously takes place by way of a CAN databus system 7. A battery management system 3, which is integrated in the removable accumulator 5, is provided for controlling the charging functions, the data exchange and the power output.

External consuming devices 6, such as a notebook computer or the like, may be connected to the removable accumulator 5. The removable accumulator 5 can supply one or more external consuming devices 6. By way of the databus 7 and the corresponding connections, the removable accumulator 5 may also be used for supporting the supply to the onboard voltage supply system 2 or the vehicle battery 1 by way of the battery management system 3. If required, the removable accumulator 5 may also be pulled out of the slide-in unit 4 and may be used as a light-weight, easily operable, mobile power accumulator expansion unit for suitable equipment.

TABLE OF REFERENCE NUMBERS 1 power accumulator
2 onboard voltage supply system
3 battery management system
4 slide-in unit
5 removable accumulator
6 consuming device
7 databus

What is claimed is:

1. A power supply system for a vehicle having an onboard voltage supply system for supplying electric consuming devices, external electric consuming devices being connectable to the onboard voltage supply system, the power supply system comprising:
   at least one portable removable accumulator chargeable via the onboard voltage supply system of the vehicle;
   a battery management system, said accumulator being a power accumulator expansion unit controllable via the battery management system and by which at least one of vehicle specific electric consuming devices and external electric consuming devices are operable;
   wherein the removable accumulator is configured to operate in a stationary power supply mode when coupled with the onboard voltage supply system and in a mobile power supply mode independently of the vehicle when not coupled with the onboard voltage supply system,
   wherein accumulator-relevant data is bidirectionally exchanged between the removable accumulator and the onboard voltage supply system of the vehicle via the battery management system; and
   wherein the at least one portable removable accumulator is operatively coupled to the onboard voltage supply system via a support assembly arranged in an interior of the vehicle, when operating in the stationary power supply mode.

2. The power supply system according to claim 1, wherein the external consuming devices are at least one of office equipment, a communication device, and an electronic entertainment unit.

3. The power supply system according to claim 1, wherein the support assembly includes a slide-in unit arranged in the interior of the vehicle, the at least one portable removable accumulator being adapted to slide into the slide-in unit.

4. The power supply system according to claim 2, wherein the support assembly includes a slide-in unit arranged in the interior of the vehicle, the at least one portable removable accumulator being adapted to slide into the slide-in unit.

5. The power supply system according to claim 1, wherein the battery management system is integrated in the removable accumulator.

6. The power supply system according to claim 1, wherein an actual charge condition of the removable accumulator is reportable to the onboard voltage supply system via the battery management system.

7. The power supply system according to claim 5, wherein an actual charge condition of the removable accumulator is reportable to the onboard voltage supply system via the battery management system.

8. The power supply system according to claim 1, wherein the supply of electrical power to the removable accumulator by the onboard voltage supply system is prioritized via the battery management system.

9. The power supply system according to claim 5, wherein the supply of electrical power to the removable accumulator by the onboard voltage supply system is prioritized via the battery management system.

10. The power supply system according to claim 1, wherein the battery management system has a limit function such that a defined maximal voltage and current intensity cannot be exceeded when the removable accumulator is being supplied with electrical power.

11. The power supply system according to claim 10, wherein the limit function includes overload protection such that a defined maximum load of the removable accumulator cannot be exceeded and triggering of a safety fuse is prevented.

12. The power supply system according to claim 1, wherein the battery management system has a blocking function such that power stored in the removable accumulator may be utilized only for defined functions.

13. The power supply system according to claim 1, wherein the removable accumulator is configured so as to be chargeable via an external power supply unit.

14. The power supply system according to claim 1, wherein the removable accumulator is a lithium ion polymer battery.

15. The power supply system according to claim 1, wherein a plurality of removable accumulators, each of which is adapted to specific uses, are chargeable by way of the onboard voltage supply system of the vehicle.

16. The power supply system according to claim 1, wherein the accumulator-relevant data is bidirectionally exchanged over a databus interposed between the battery management system and the onboard voltage supply system.

17. The power supply system according to claim 16, wherein the databus includes a controller area network (CAN) databus.

* * * * *